(12) United States Patent
Watson et al.

(10) Patent No.: US 10,310,314 B2
(45) Date of Patent: Jun. 4, 2019

(54) BRIGHT EDGE DISPLAY FOR SEAMLESS TILEABLE DISPLAY PANELS

(71) Applicant: X Development LLC, Mountain View, CA (US)

(72) Inventors: Philip E. Watson, Mountain View, CA (US); Pey Lung Fu, Taipei (TW); Hung-Yu Chen, Zhubei (TW); Carlin Vieri, Menlo Park, CA (US); Adam E. Norton, Palo Alto, CA (US); Andrei S. Kazmierski, Pleasanton, CA (US); Serge J. A. Bierhuizen, San Jose, CA (US); Nicholas C. Loomis, Oakland, CA (US); Behnam Bastani, San Jose, CA (US); Yachi Lee, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 682 days.

(21) Appl. No.: 14/826,743

(22) Filed: Aug. 14, 2015

(65) Prior Publication Data

US 2017/0045769 A1 Feb. 16, 2017

(51) Int. Cl.
*G02F 1/133* (2006.01)
*G02F 1/1333* (2006.01)
(Continued)

(52) U.S. Cl.
CPC .... *G02F 1/13336* (2013.01); *G02F 1/133526* (2013.01); *G02F 1/133602* (2013.01);
(Continued)

(58) Field of Classification Search
CPC .......... G02F 1/13336; G02F 1/133514; G02F 2001/133388; G02F 2201/52
(Continued)

(56) References Cited

U.S. PATENT DOCUMENTS

| 6,188,454 B1 | 2/2001 | Greene et al. |
| 6,680,761 B1 | 1/2004 | Greene et al. |

(Continued)

FOREIGN PATENT DOCUMENTS

| WO | WO 2008/022464 A1 | 2/2008 |
| WO | WO 2014/070684 A1 | 5/2014 |

OTHER PUBLICATIONS

PCT/US2016/043011—International Search Report and Written Opinion, dated Oct. 26, 2016, 12 pages.
(Continued)

*Primary Examiner* — Paisley L Arendt
(74) *Attorney, Agent, or Firm* — Christensen O'Connor Johnson Kindness PLLC

(57) ABSTRACT

A display panel includes an array of display pixels to output an image. The array of display pixels includes a central pixel region and a perimeter pixel region. The central pixel region includes central pixel units each having three different colored sub-pixels. The different colored sub-pixels of the central pixel units are organized according to a central layout pattern that repeats across the central pixel region. The perimeter pixel region is disposed along a perimeter of the central pixel region and includes perimeter pixel units that increase a brightness of the image along edges of the central pixel region to mask gaps around the array of display pixels when tiling the array of display pixels with other arrays of display pixels.

25 Claims, 11 Drawing Sheets

(51) Int. Cl.
*G02F 1/1343* (2006.01)
*G02F 1/1335* (2006.01)

(52) U.S. Cl.
CPC .. *G02F 1/133611* (2013.01); *G02F 1/134309* (2013.01); *G02F 2001/133388* (2013.01); *G02F 2001/134345* (2013.01); *G02F 2201/52* (2013.01)

(58) Field of Classification Search
USPC .......................................................... 349/73
See application file for complete search history.

(56) References Cited

U.S. PATENT DOCUMENTS

| | | |
|---|---|---|
| 7,256,550 B2 | 8/2007 | Park et al. |
| 7,948,672 B2 | 5/2011 | Sampsell |
| 8,013,816 B2 | 9/2011 | Kim |
| 8,390,532 B2 | 3/2013 | Hanamura et al. |
| 9,030,375 B2 | 5/2015 | Curtis et al. |
| 2003/0231144 A1* | 12/2003 | Cho ................... G02B 5/045 345/1.3 |
| 2005/0225575 A1* | 10/2005 | Brown Elliott ... G02F 1/133514 345/694 |
| 2006/0055864 A1 | 3/2006 | Matsumura et al. |
| 2007/0132778 A1 | 6/2007 | Gallen et al. |
| 2009/0079681 A1 | 3/2009 | Chang et al. |
| 2009/0195481 A1* | 8/2009 | Taguchi ................ G02B 5/201 345/55 |
| 2012/0120007 A1 | 5/2012 | Choi et al. |
| 2012/0256534 A1 | 10/2012 | Lee et al. |
| 2013/0135589 A1 | 5/2013 | Curtis et al. |
| 2015/0138755 A1 | 5/2015 | Bastani et al. |

OTHER PUBLICATIONS

Fu, B. et al., "Tileable Display With Pixel-Tape", U.S. Appl. No. 14/318,137, filed Jun. 27, 2014, whole document.

Kazmierski, A. et al., "Masking Mechanical Separations Between Tiled Display Panels", U.S. Appl. No. 14/584,233, filed Dec. 29, 2014, whole document.

* cited by examiner

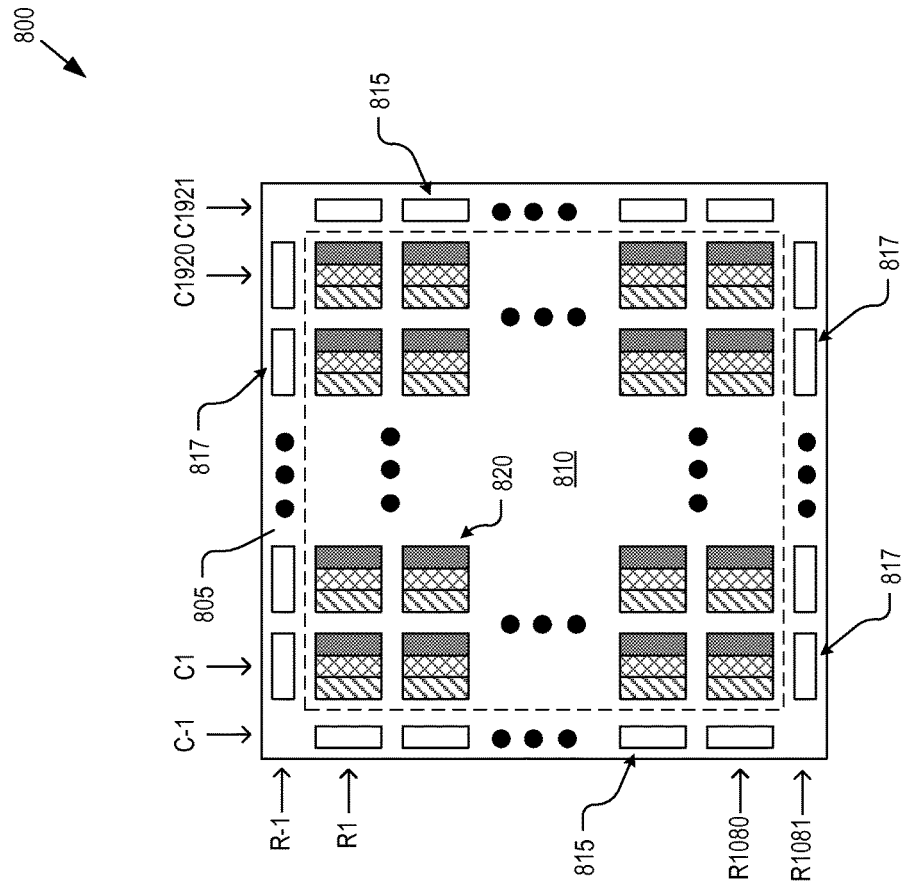
FIG. 8
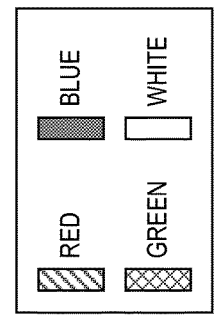

BRIGHT EDGE DISPLAY FOR SEAMLESS TILEABLE DISPLAY PANELS

TECHNICAL FIELD

This disclosure relates generally to display panels, and in particular but not exclusively, relates to seamless tiling of display panels.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 8 illustrates how perimeter pixel units can combine extra pixel units, white sub-pixels, and pixel unit rotation, in accordance with an embodiment of the disclosure.

DETAILED DESCRIPTION

Embodiments of a system and method for seamless tileable display panels that visually mask inter-panel gaps are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
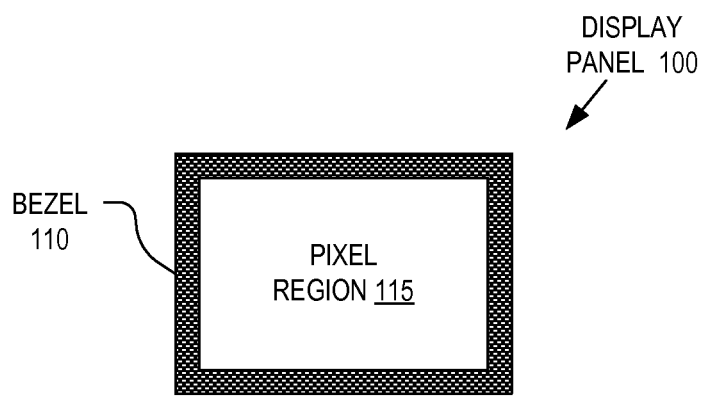
FIGS. 1A & 1B (PRIOR ART) illustrate conventional display panel tiling.
Figure 1B:
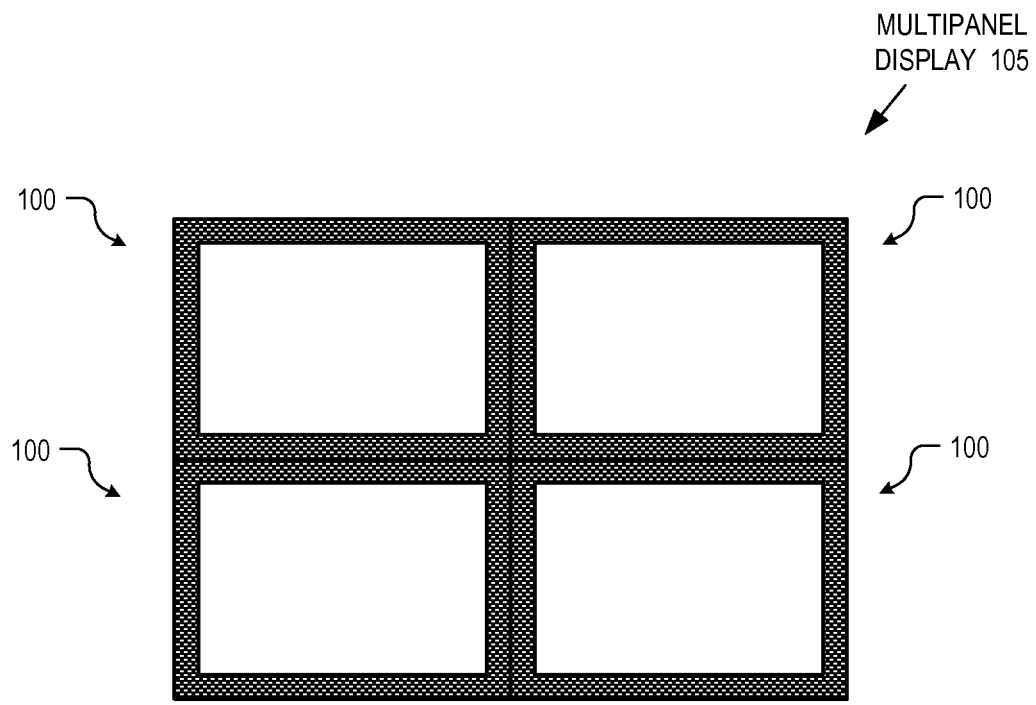
Figure 2:
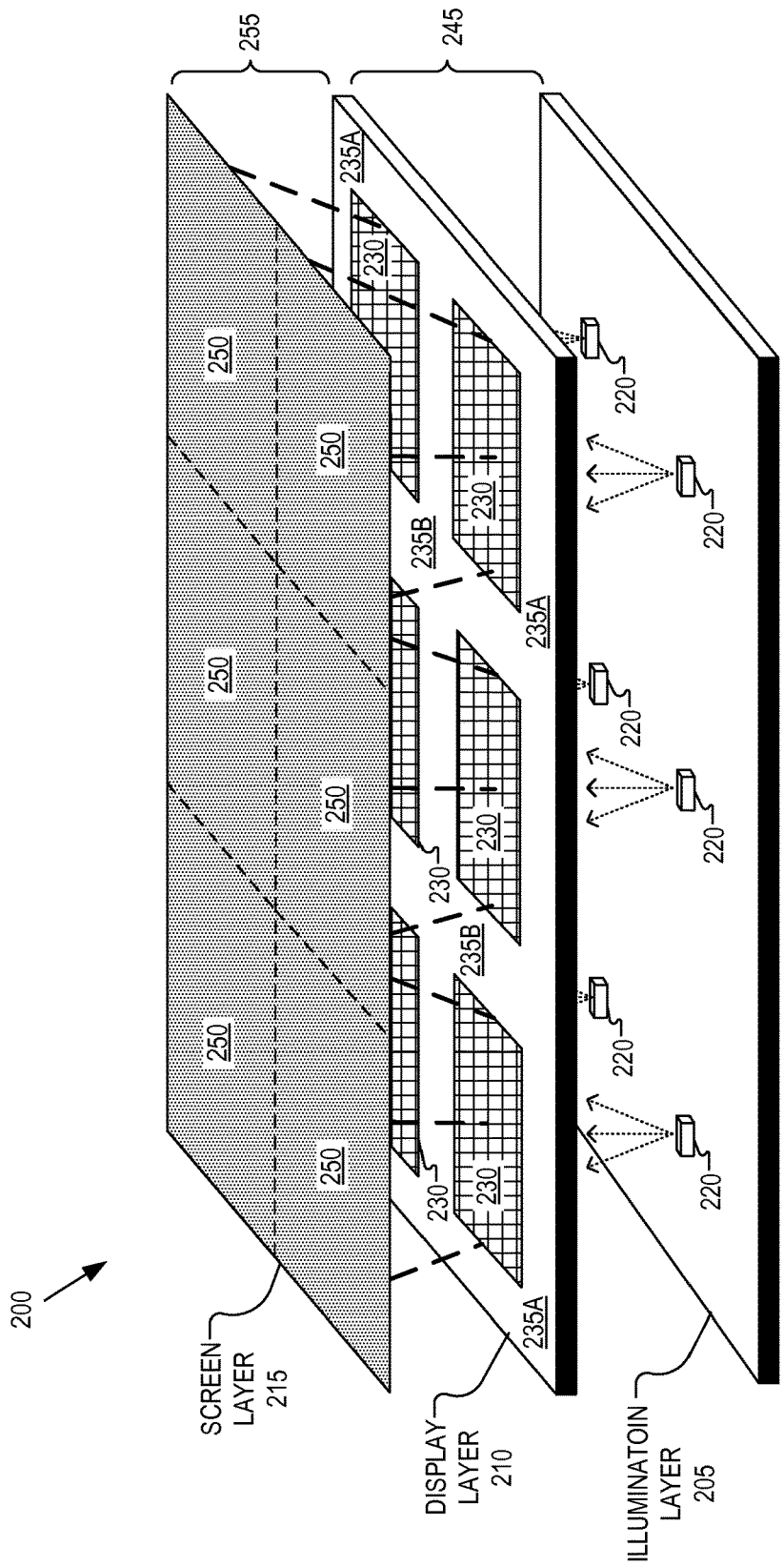
FIG. 2 is a perspective view illustrating functional layers of a tileable display panel, in accordance with an embodiment of the disclosure.
Figure 3A:
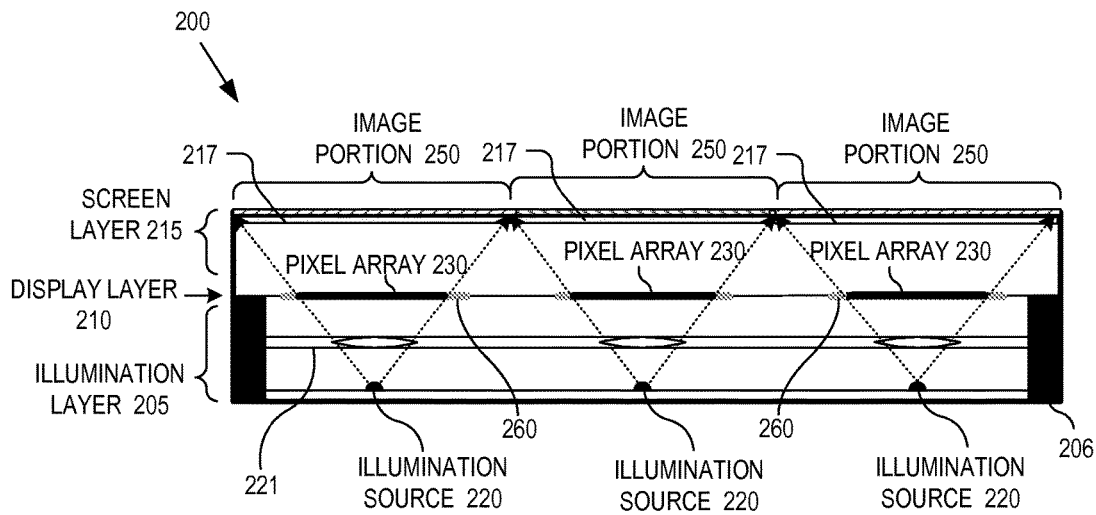
FIG. 3A is a cross-sectional view of functional layers of a tileable display panel, in accordance with an embodiment of the disclosure.

FIGS. 2 and 3A illustrate functional layers of a tileable display panel 200 that uses a bright edge technique to mask seams between display pixel arrays, in accordance with an embodiment of the disclosure. FIG. 2 is a perspective view of the layers of display panel 200 while FIG. 3A is a cross-section view of the same. The illustrated embodiment of display panel 200 includes an illumination layer 205, a display layer 210, and a screen layer 215. The illustrated embodiment of illumination layer 205 includes an array of illumination sources 220 and a lensing layer 221 (illustrated in FIG. 3A only for clarity). The illustrated embodiment of display layer 210 includes transmissive pixel arrays 230 separated from each other by spacing regions 235A and 235B (collectively 235). The illustrated embodiment of screen layer 215 is divided into regions for displaying image portions 250 of an overall unified image. Screen layer 215 may include a number of optical sub-layers, such as collimating layers or otherwise. For example, in one embodiment, screen layer 215 includes an array of Fresnel lenses 217 (see FIG. 3A), with each Fresnel lens 217 centered over a corresponding pixel array 230. Tileable display panel 200 is made up of a plurality of pixlets, each including an illumination source 220, transmissive pixel array 230, a Fresnel lens 217, and a screen region for displaying an image portion 250 all aligned within a column through display 200.

In the illustrated embodiment, each illumination source 220 is aligned under a corresponding pixel array 230 to illuminate a backside of the corresponding pixel array with lamp light. Illumination sources 220 may be implemented as independent light sources (e.g., color or monochromatic LEDs, quantum dots, etc.) that emit light with a defined angular spread or cone to fully illuminate their corresponding transmissive pixel array 230 residing above on display layer 210. The illumination layer 205 and display layer 210 are separated from each other by a fixed distance 245 (e.g., 8 mm). This separation may be achieved using a transparent intermediary (e.g., glass or plastic layers) and may further include one or more lensing layers 221 (including lenses, apertures, beam confiners, etc.) to control or manipulate the angular extent and cross-sectional shape of the lamp light emitted from illumination sources 220. In one embodiment, an illumination controller may be coupled to illumination sources 220 to control their illumination intensity. Illumination layer 205 may include a substrate upon which illumination sources 220 are disposed.

Transmissive pixel arrays 230 are disposed on the display layer 210 and each includes an array of transmissive pixels (e.g., 120 pixels by 120 pixels). In one embodiment, the transmissive pixels may be implemented as backlit liquid crystal pixels. Each transmissive pixel array 230 is an independent display array that is separated from adjacent transmissive pixel arrays 230 by spacing regions 235 on display layer 210. The internal spacing regions 235B that separate adjacent pixel arrays 230 from each other may be twice the width as the perimeter spacing regions 235A that separate a given pixel array 230 from an outer edge of display layer 210. In one embodiment, the internal spacing regions 235B have a width of 4 mm while the perimeter spacing regions 235A have a width of 2 mm. Of course, other dimensions may be implemented.

As illustrated, transmissive pixel arrays 230 are spaced across display layer 210 in a matrix with spacing regions 235 separating each transmissive pixel array 230. In one embodiment, transmissive pixel arrays 230 each represent a separate and independent array of display pixels (e.g., backlit LCD pixels). Spacing region 235 are significantly larger than the inter-pixel separation between pixels of a given transmissive pixel array 230. Spacing regions 235 provide improved flexibility for routing signal lines or the inclusion of additional circuitry, such as a display controller. Spacing regions 235A that reside along the exterior perimeter of display layer 210 also provide space for the bezel trim 206 of display 200. Bezel trim 206 operates as the sides of the housing for display 200. The spacing regions 235A that reside along the exterior perimeter also provide space for power and/or communication ports.

Although FIG. 2 illustrates display layer 210 as including six transmissive pixel arrays 230 arranged into two rows and three columns, it should be appreciated that various implementations of display 200 may include more or less transmissive pixel arrays 230 organized into differing combinations of rows and columns. As such, in embodiments having a one-to-one ratio of illumination sources 220 to transmissive pixel arrays 230, the number and layout of illumination sources 220 on illumination layer 205 may also vary. While FIG. 2 does not illustrate intervening layers between the three illustrated layers for the sake of clarity, it should be appreciated that embodiments may include various intervening optical or structural sub-layers, such as lens arrays (e.g., Fresnel lenses 217, lens layers 221, etc.), transparent substrates to provide mechanical rigidity and optical offsets, protective layers, or otherwise.

Figure 3B:
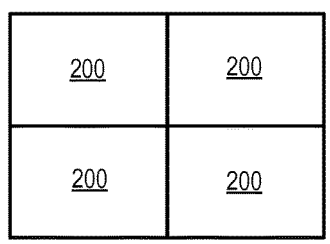
FIG. 3B illustrates how tileable display panels can be tiled to form larger seamless displays, in accordance with an embodiment of the disclosure.

Transmissive pixel arrays 230 are switched under control of a display controller to modulate the lamp light and project image portions 250 onto a backside of screen layer 215. In various embodiments, screen layer 215 includes matte material (or other diffusing material suitable for rear projection) that is disposed on a transparent substrate providing mechanical support. As illustrated in FIG. 3A, screen layer 215 includes an array of Fresnel lenses 217 that bend the display light to be substantially normal prior to incidence upon a diffusion layer. The Fresnel lenses 217 improve the angular brightness uniformity of display light exiting screen layer 215 while the diffusion layer increases viewing angles. Image portions 250 collectively blend together on screen layer 215 to present a unified image to a viewer from the viewing side of screen layer 215 that is substantially without seams. In other words, the images created by transmissive pixel arrays 230 are magnified as they are projected across separation 255 (e.g., 2 mm) between display layer 210 and screen layer 215. The image portions 250 are magnified enough to extend over and cover spacing regions 235 forming a seamless unified image. The magnification factor is dependent upon separation 255 and the angular spread of the lamp light emitted by illumination sources 220. In one embodiment, image portions 250 are magnified by a factor of approximately 1.5, though other magnification factors may be implemented. Not only does the unified image cover the internal spacing regions 235B, but also covers the perimeter spacing regions 235A. As such, display panel 200 may be positioned adjacent to other tileable display panels 200 and communicatively interlinked to form larger composite seamless displays, in which case the unified image generated by a single tileable display panel becomes a sub-portion of a multi-tile unified image (e.g., see FIG. 3B).

Figure 3C:
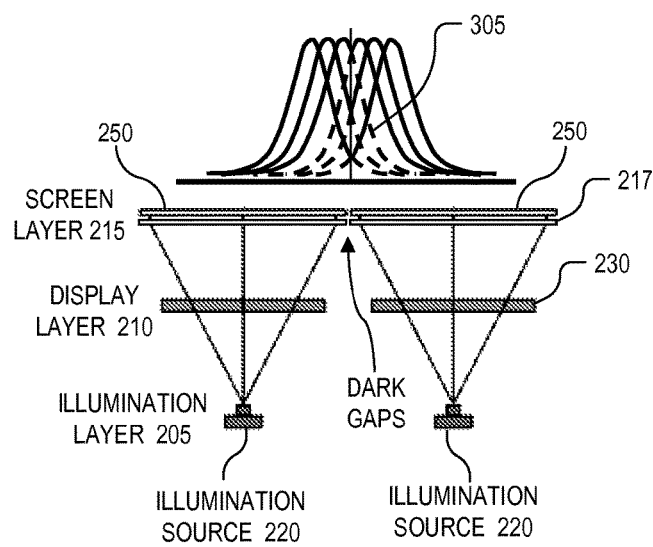
FIG. 3C illustrates how increasing the brightness of perimeter pixel units can mask dark gaps between adjacent pixel arrays or tileable display panels, in accordance with embodiments of the disclosure.

In a tiled rear-projection architecture, such as the one illustrated in FIGS. 2 and 3A, display light incident upon a backside of screen layer 215, which includes Fresnel lenses 217, is not collimated. This divergent light can result in brightness variations or dark gaps at the seams between pixel arrays 230 and between the edges of tiled display panels 200. It is believed that these dark gaps arise, at least in part, due to the edges of Fresnel lens 217 truncating the tails 305 of the Gaussian-like distribution of the light emitted from the perimeter pixels surrounding the extreme edges of each pixel array 230. As illustrated in FIG. 3C, these dark spots can appear around the perimeter of each image portion 250 defined by a given pixlet. Accordingly, embodiments of the instant disclosure present various techniques for compensating for this lost or truncated light by increasing the brightness of perimeter pixels to mask the dark gaps at these seams. These bright edge techniques are particularly useful around the perimeter of a given display panel 200 to mask the inter-panel seam, but are equally applicable for use around the perimeter of each pixel array 230 to mask the inter-pixel array seams on a given display panel 200. Accordingly, embodiments disclosed here include perimeter pixel regions 260 (see FIG. 3A) to provide increased brightness to seam regions relative to the brightness of central pixel regions.

Figure 4:
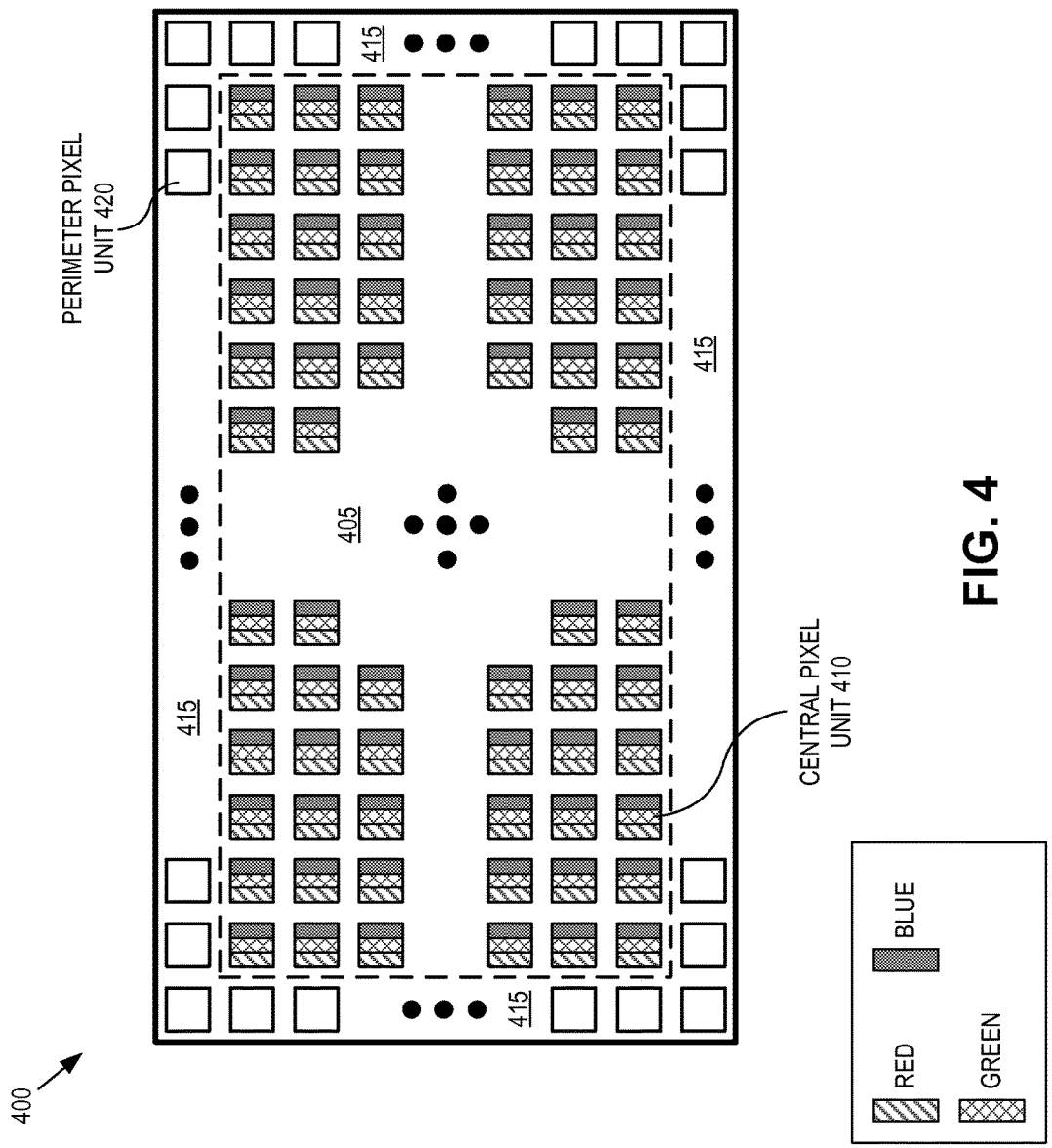
FIG. 4 illustrates a tileable display panel having central pixel units and perimeter pixel units, in accordance with an embodiment of the disclosure.

FIG. 4 illustrates a tileable display panel 400 that uses brightened perimeter pixel regions to mask inter-panel seams, in accordance with an embodiment of the disclosure. FIG. 4 is a plan view illustration of just a display pixel array (e.g., display layer 210) of tileable display panel 400. The illustrated embodiment of display panel 400 includes a central pixel region 405 including central pixel units 410 and a perimeter pixel region 415 including perimeter pixel units 420.

Although FIG. 4 does not illustrate central pixel units 410 and perimeter pixel units 420 being organized into the pixlet architecture illustrated in FIGS. 2 and 3A, it should be appreciated that the organization of pixel units into a central pixel region having central pixel units and a perimeter pixel region having perimeter pixel units is equally applicable on a per pixlet or pixel array 230 basis.

In the illustrated embodiment, central pixel units 410 are a collection of three different colored sub-pixels that collectively represent a single display pixel in an image. For example, the three different colored sub-pixels may be red, green, and blue pixels or cyan, yellow, and magenta, or other tri-color selections capable of displaying full color images. Of course, in other embodiments, a pixel unit may include more or less numbers of sub-pixels. The sub-pixels of central pixel units 410 are organized according to a central layout pattern that repeats across central pixel region 405. In the illustrated embodiment, the repeating central layout pattern cycles through red-green-blue moving left to right in each row.

Perimeter pixel region 415 is disposed along a perimeter of central pixel region 405. In the illustrated embodiment, perimeter pixel region 415 entirely surrounds central pixel region 405; however, in other embodiments, perimeter pixel region 415 may extend along just one or more sides of central pixel region 405. Perimeter pixel units 420 may include one or more sub-pixels (not illustrated in FIG. 4), which can be colored (e.g., red, green, blue) or white. The sub-pixels of perimeter pixel units 420 may be the same size, smaller, or larger than the sub-pixels of central pixel units 410. In various embodiments, the sub-pixel units of perimeter pixel units 420 may also be organized according to a repeating perimeter layout pattern, though this repeating pattern may be different than the central layout pattern.

In various embodiments discussed below, perimeter pixel units 420 may be organized using different combination of sub-pixels with different perimeter layout patterns that increase the brightness of the image output near the edges or perimeter of display panel 400 so as to mask or otherwise obscure dark gaps between tiled pixel arrays or tiled display panels. The increased brightness along the edges provided by perimeter pixel units 420 relative to the brightness of the image output by central pixel units 410 compensates for the dark gaps thereby providing a seamless or near seamless image as perceived by a viewer.

Again, it should be noted that FIG. 4 illustrates the concept of bright edges with reference to a pixel array spanning an entire display panel 400; however, these concepts are equally applicable to individual pixel arrays 230 each spanning merely a portion of display layer 210 of tileable display panel 200. Accordingly, the pixel array illustrated in FIG. 4 may represent, for example, a full 1920×1080 pixel array of an entire display panel, or 120 by 120 pixel array of a single pixlet. Of course, other pixel array sizes may be implemented.

Figure 5:
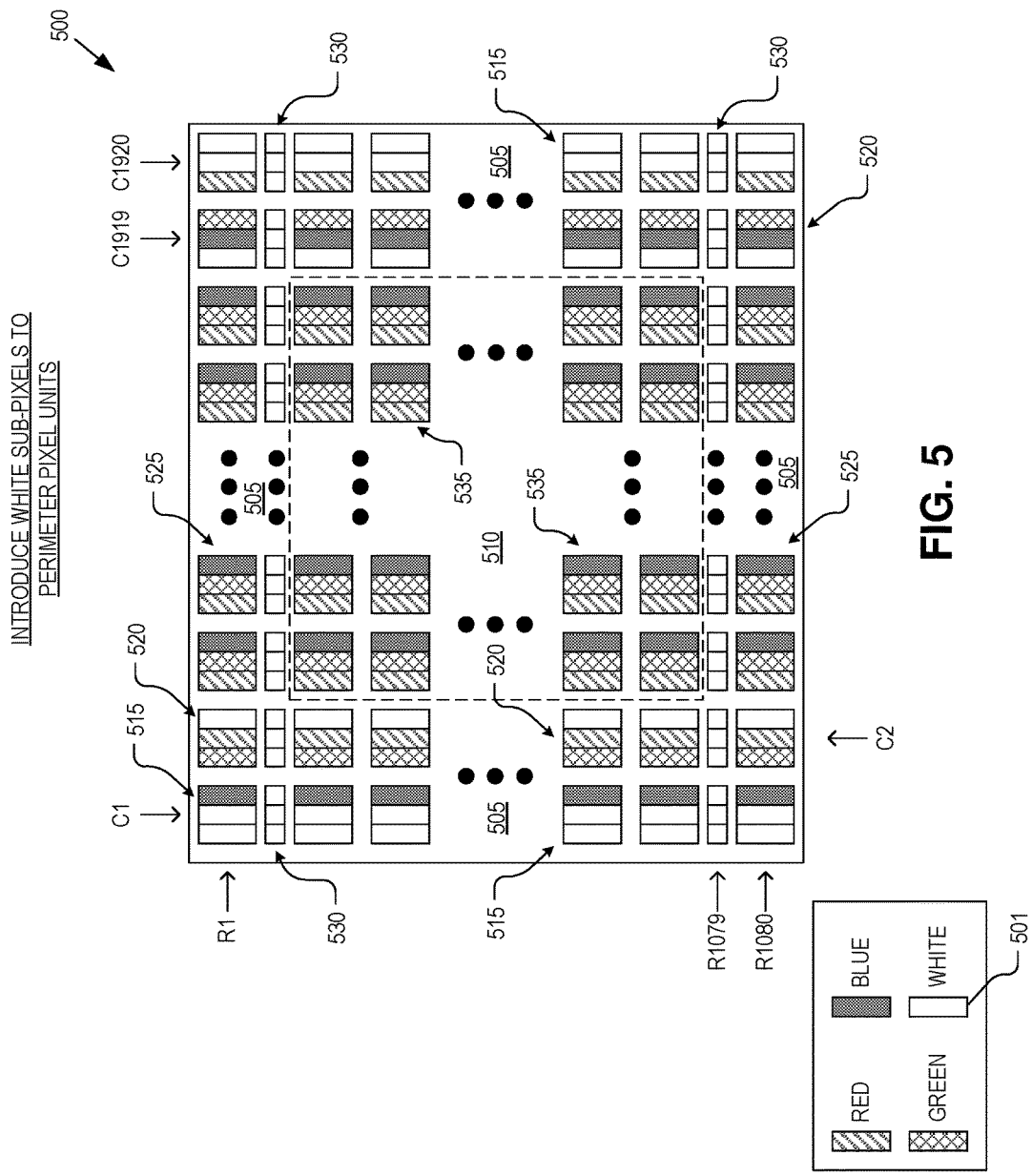
FIG. 5 illustrates how the perimeter pixel units can include white sub-pixels to increase perimeter brightness, in accordance with an embodiment of the disclosure.

FIG. 5 illustrates how perimeter pixel units of a display pixel array 500 can include white sub-pixels to increase perimeter brightness, in accordance with an embodiment of the disclosure. The illustrated embodiment of display pixel array 500 includes perimeter pixel region 505 and central pixel region 510. The illustrated embodiment of perimeter pixel region 505 includes perimeter pixel units 515, 520, 525, and 530. The illustrated embodiment of central pixel region 510 includes central pixel units 535.

As illustrated, some of the perimeter pixel units within perimeter pixel region 505 include white sub-pixels 501, which operate to increase the brightness of the display light output in perimeter pixel region 505 relative to the brightness of the display light output in central pixel region 510. In various embodiments, white sub-pixels 501 may be uniformly dispersed throughout perimeter pixel region 505, dispersed according to a perimeter layout pattern, or otherwise. For example, the embodiment illustrated in FIG. 5 includes two white sub-pixels 501 per perimeter pixel unit 515 in the outer most columns C1 and C1920, while including just one white sub-pixel 501 per perimeter pixel unit 520 in columns C2 and C1919. Furthermore, in the illustrated embodiment, perimeter pixel units 525 do not include any white sub-pixels 501; however, brightness along the top and bottom is increased using perimeter pixel units 530. Perimeter pixel units 530 are made up of three small white sub-pixels. In one embodiment, the three white sub-pixels of perimeter pixel units 530 have an area equal to a single color sub-pixel. The smaller sized perimeter pixel units 530 facilitate routing of signal paths under the display pixel array 500 in a complementary manner with the central pixel units 535 while constraining the amount of white light output along the upper and lower rows R1 and R1080.

Accordingly, perimeter pixel region 505 can be implemented with different thicknesses (e.g., 1, 2, 3, or more perimeter pixel units deep along the top, bottom, and/or sides), having various pattern layouts and configurations of white sub-pixels and color sub-pixels, and with different sizes or orientations of the perimeter pixel units themselves.

The introduction of white sub-pixels 501 into the perimeter pixel units reduce the color saturation of those perimeter pixel units by increasing the relative amount of white light vs color light. This increased brightness visually camouflages dark, physical gaps that may be present around the edges of display pixel array 500 when it is tiled with other display pixel arrays. In some embodiments, the color saturation of central pixel units 535 adjacent to perimeter pixel region 505 may be dynamically adjusted in software to provide a gradual change in the color saturation towards the perimeter pixel units. For example, the color saturation of central pixel units 535 near the outer edges of central pixel region 510 may be reduced. By inserting white sub-pixels amongst colored sub-pixels within the perimeter pixel units, as opposed to only having white sub-pixels, color image data is still output from perimeter pixel region 505, but with increased brightness for visually masking gaps.

Figure 6:
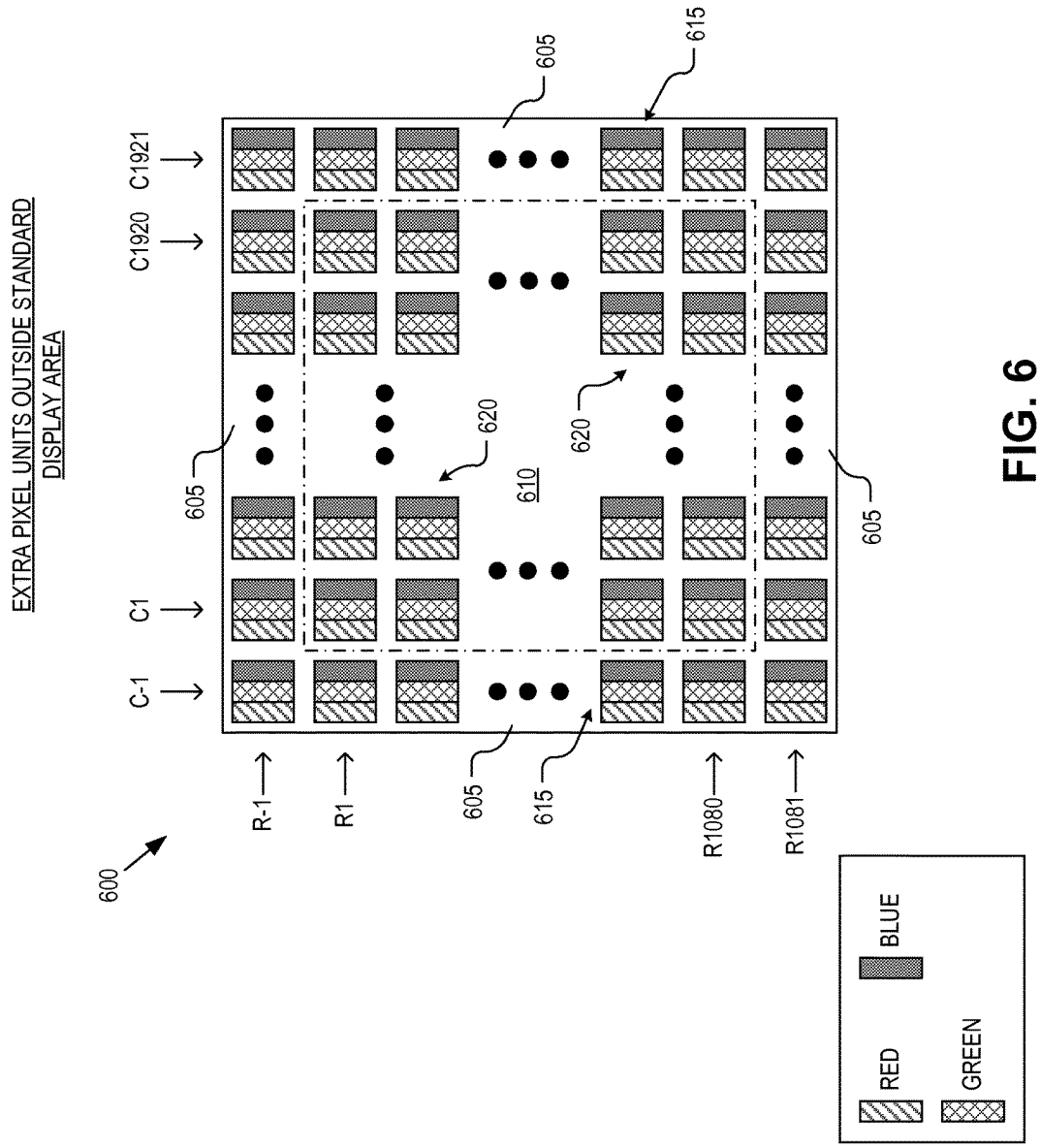
FIG. 6 illustrates how the perimeter pixel units can be extra pixel units outside the standard display area provided by the central pixel units, in accordance with an embodiment of the disclosure.

FIG. 6 illustrates how perimeter pixel units of a display pixel array 600 can be extra pixel units outside the standard display area provided by the central pixel units, in accordance with an embodiment of the disclosure. The illustrated embodiment of display pixel array 600 includes perimeter pixel region 605 and central pixel region 610. The illustrated embodiment of perimeter pixel region 605 includes perimeter pixel units 615. The illustrated embodiment of central pixel region 610 includes central pixel units 620.

The extra pixel units within perimeter pixel region 605 are display pixel units that are in addition to the standard size pixel array used to display the image content. In other words, if the display image output from display pixel array 600 is an N×M pixel image, then perimeter pixel units 615 represent display pixels that extend beyond or outside the N×M pixels. These extra pixel units do not directly correspond to an image pixel within the image content. As such, perimeter pixel units 615 may be thought of as "phantom pixels." Since extra pixel units of perimeter pixel region 605 do not have corresponding image data in the image content itself, this image content is generated or borrowed. In some embodiments, perimeter pixel units 615 obtaining their image data from an adjacent central pixel unit 620. In one embodiment, the brightness bias of this borrowed image data may be adjusted to increase the brightness output of the extra pixel units.

The extra pixel units of display pixel array 600 are suitable for use with the multi-array display architecture illustrated in FIGS. 2 and 3. Referring to FIG. 3C, in this display architecture, the extra display pixels or phantom pixels (perimeter pixel units 615) operate to replace light tails 305 that are truncated by Fresnel lenses 217.

Figure 7:
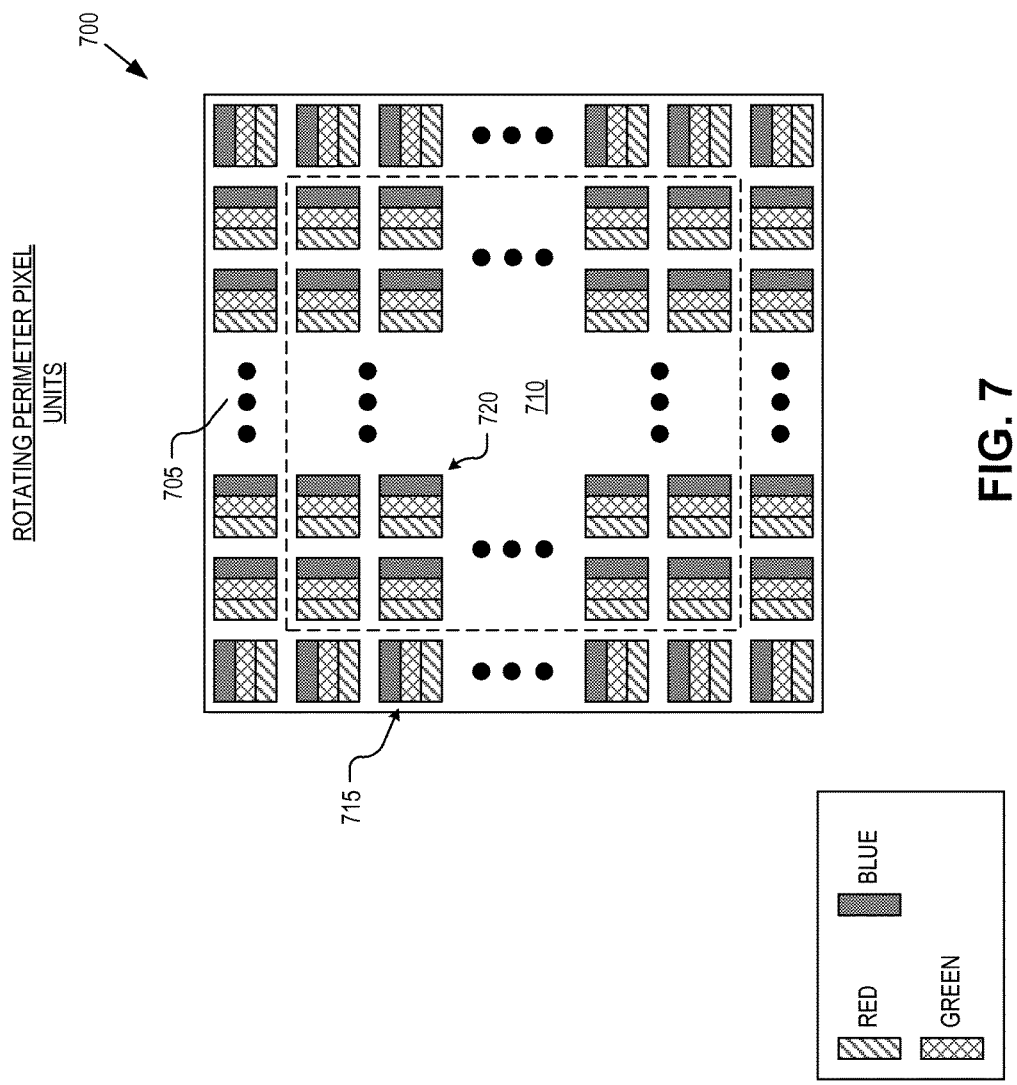
FIG. 7 illustrates how the perimeter pixel units can be rotated to obscure perimeter seams, in accordance with an embodiment of the disclosure.

FIG. 7 illustrates how at least some of the perimeter pixel units of a display pixel array 700 can be rotated to obscure perimeter seams, in accordance with an embodiment of the disclosure. The illustrated embodiment of display pixel array 700 includes perimeter pixel region 705 and central pixel region 710. The illustrated embodiment of perimeter pixel region 705 includes perimeter pixel units 715. The illustrated embodiment of central pixel region 710 includes central pixel units 720.

As illustrated, at least a portion of perimeter pixel units 715 are rotated relative to the orientation of central pixel units 720. Rotation of perimeter pixel units 715 can aid the seamless blending between adjacent pixel arrays by introducing irregular patterns at the seams. Regular patterns are more perceptible to the human eye. Furthermore, rotating perimeter pixel units 715 leads to less desaturation of color when a white sub-pixel is used. By rotating some perimeter pixel units 715, all sub-pixels have the same distance from edge gaps, thereby more uniformly contributing light from each sub-pixel to the gap regions. Accordingly, the rotation of perimeter pixel units 715 may occur along just left and right perimeter sides while the top and bottom sides are not rotated. In other embodiments, some or all perimeter pixel units 715 may be rotated. In addition to rotating perimeter pixel units 715, the size and shape of some or all perimeter pixel units 715 may be changed or modified relative to central pixel units 720 to further introduce irregular patterns and/or increase the brightness of perimeter pixel units 715. For example, by increasing the aperture size of perimeter pixel units 715 relative to central pixel units 720, their brightness can be further increased.

FIG. 8 illustrates how perimeter pixel units of a display pixel array 800 can combine extra pixel units, white sub-pixels, and pixel unit rotation, in accordance with an embodiment of the disclosure. The illustrated embodiment of display pixel array 800 includes perimeter pixel region 805 and central pixel region 810. The illustrated embodiment of perimeter pixel region 805 includes perimeter pixel units 815 and 817. The illustrated embodiment of central pixel region 810 includes central pixel units 820.

As illustrated, display pixel array 800 combines a number of the techniques described above to increase the brightness of perimeter pixel region 805 and obscure gaps around display pixel array 800 when tiling. For example, perimeter pixel units 815 and 817 are extra pixel units or phantom pixel units that are outside the standard image area. These extra pixel units are also white sub-pixels that provide additional white light luminance along the edges. Furthermore, the perimeter pixel region 805 has a uniform thickness by rotating the upper and lower perimeter pixel units 817 relative to central pixel units 820 while retaining the same rotation orientation between perimeter pixel units 815 along the sides and central pixel units 820.

Figure 9A:
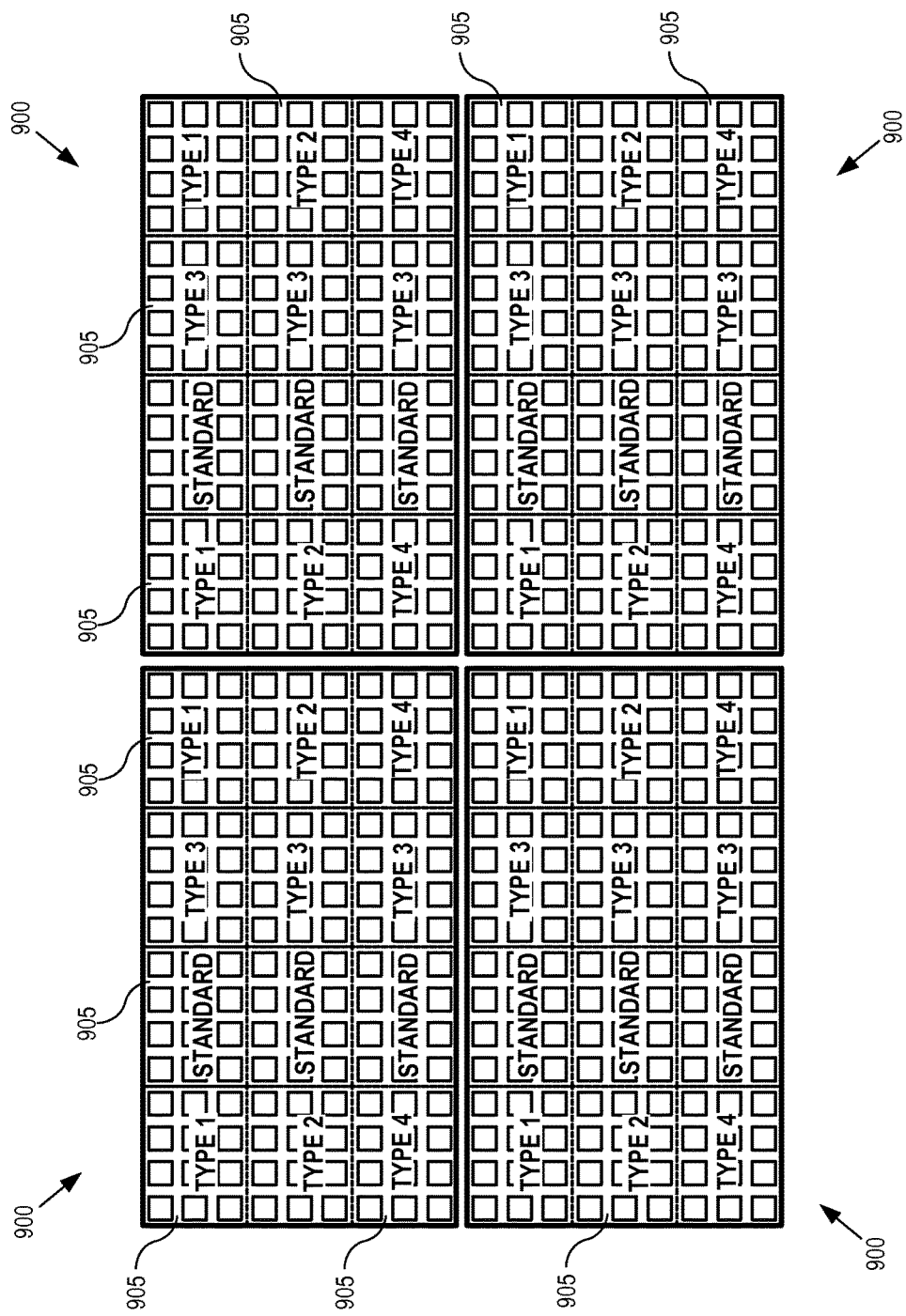
FIGS. 9A-C illustrate how the perimeter pixel units of the various pixel arrays on a tileable display panel can have different unit layout patterns based upon location, in accordance with an embodiment of the disclosure.
Figure 9B:
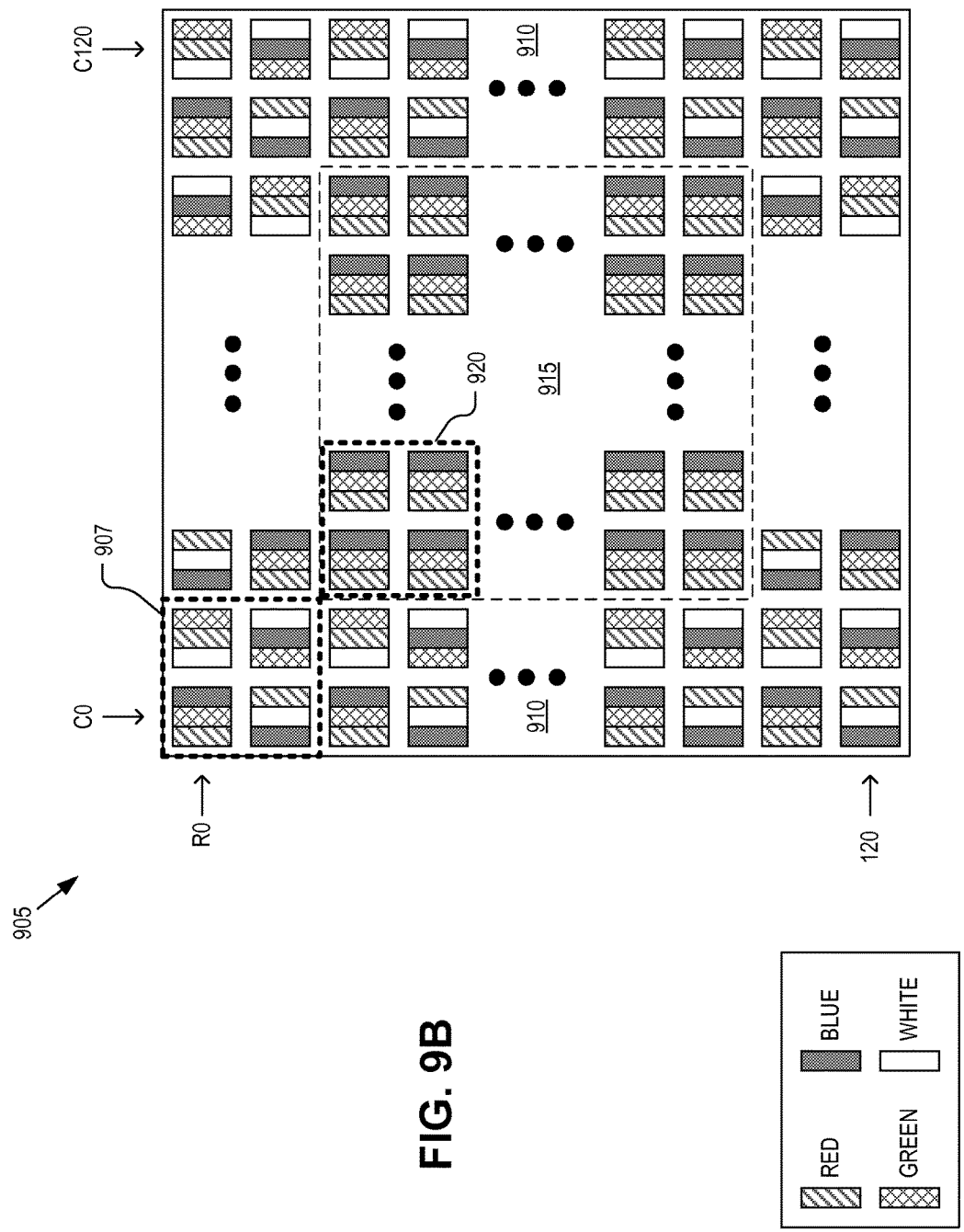
Figure 9C:
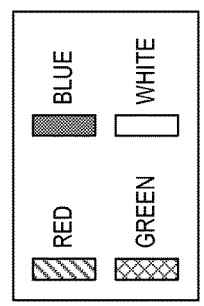

FIGS. 9A-C illustrate how the perimeter pixel units of the various pixel arrays 905 on tileable display panels 900 can have different pixel unit layout patterns, in accordance with an embodiment of the disclosure. In some embodiments, these different layout patterns can vary based upon location of a given display pixel array within tileable display panel 900.

FIG. 9A illustrates four display panels 900 tiled together to form a seamless multi-panel display. Each display panel 900 includes display pixel arrays 905 having perimeter pixel units organized according to perimeter layout patterns that vary based upon locations of each display pixel array 905 within a given tileable display panel 900. For example, FIG. 9A illustrates five different layout patterns (standard, type 1, type 2, type 3, and type 4). In other embodiments, all display pixel arrays 905 share the same perimeter layout pattern.

FIG. 9B illustrates an example display pixel array 905 having a perimeter pixel unit pattern 907 that repeats around perimeter pixel region 910. Central pixel region 915 includes central pixel units that repeat according to the "standard" layout pattern 920. FIG. 9C illustrates example perimeter pixel unit patterns 925, including pattern types: standard, type 1, type 2, type 3, and type 4. Other layout patterns for both the perimeter pixel units and the central pixel units may be implemented.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display panel, comprising:
an array of display pixels to output an image, the array of display pixels including:
a central pixel region including central pixel units each having three different colored sub-pixels, wherein the different colored sub-pixels of the central pixel units are organized according to a central layout pattern that repeats across the central pixel region; and
a perimeter pixel region disposed along a perimeter of the central pixel region, the perimeter pixel region including perimeter pixel units that increase a brightness of the image along edges of the central pixel region to mask gaps around the array of display pixels when tiling the array of display pixels with other arrays of display pixels, wherein the perimeter pixel units include different combinations of white and colored sub-pixels within the perimeter pixel region, the perimeter pixel units including first perimeter pixel units each having two white sub-pixels and one colored sub-pixel and second perimeter pixel units each having one white sub-pixel and two colored sub-pixels, wherein the first perimeter pixel units are peripheral to the second perimeter pixel units, and the two white sub-pixels of a given one of the first perimeter pixel units are separated from the one white sub-pixel of a given one of the second perimeter pixel units by the two colored sub-pixels of the given one of the second perimeter pixel units and the one colored sub-pixel of the given one of the first perimeter pixel units.

2. The display panel of claim 1, wherein at least a portion of the perimeter pixel units include the white sub-pixels.

3. The display panel of claim 2, wherein at least a portion of the perimeter pixel units include the colored sub-pixels.

4. The display panel of claim 3, wherein a portion of the perimeter pixel units are white pixel units that only include reduced size white sub-pixels that are smaller than the colored sub-pixels.

5. The display panel of claim 4, wherein the perimeter pixel region includes two adjacent sub-pixel columns of the white sub-pixels disposed along left and right perimeter regions and includes a row of the white sub-pixels disposed along top and bottom perimeter regions.

6. The display panel of claim 1, wherein the central pixel units of the central pixel region generate the image having an N×M pixel resolution and wherein the perimeter pixel units are extra pixel units outside the N×M pixel resolution.

7. The display panel of claim 6, further comprising:
a screen layer upon which the image is projected from the array of display pixels;
an illumination layer to illuminate the array of display pixels, wherein the array of display pixels is disposed between the illumination layer and the screen layer; and
a Fresnel lens disposed between the screen layer and the array of display pixels,
wherein the perimeter pixel units provide extra light to a perimeter boundary of the Fresnel lens to compensate light truncation of the central pixel units caused by the perimeter boundary of the Fresnel lens.

8. The display panel of claim 1, wherein at least a portion of the perimeter pixel units are rotated 90 degrees relative to the central pixel units.

9. The display panel of claim 1, further comprising:
a display layer including a plurality of arrays of display pixels, wherein an inter-array separation pitch between adjacent arrays of the plurality of arrays of display pixels is greater than an inter-pixel pitch between adjacent central pixel units;
a screen layer upon which the image is projected from the plurality of arrays of display pixels; and
an illumination layer to illuminate a backside of the display layer.

10. The display panel of claim 9, wherein the perimeter pixel units of the plurality of arrays of display pixels have layout patterns that vary based upon locations of each of the plurality of arrays of display pixels within the display layer.

11. The display panel of claim 1, wherein the different combinations of the white sub-pixels and the colored sub-pixels within the perimeter pixel units vary based upon location within the perimeter pixel region.

12. The display panel of claim 1, wherein the central pixel units and the perimeter pixel units all include three sub-pixels each.

13. A tileable display panel, comprising:
an illumination layer;
a screen layer; and
a display layer disposed between the illumination layer and the screen layer to be illuminated from behind by the illumination layer and to project an image onto the screen layer, the display layer including a plurality of display pixel arrays, wherein at least a portion of the plurality of display pixel arrays each includes:
a central pixel region including central pixel units each having three different colored sub-pixels, wherein the different colored sub-pixels of the central pixel units are organized according to a central layout pattern that repeats across the central pixel region; and
a perimeter pixel region disposed along a perimeter of the central pixel region, the perimeter pixel region including perimeter pixel units that increase a brightness of the image along edges of the central pixel region to mask inter-panel gaps when tiling the tileable display panel with other tileable display panels, wherein the perimeter pixel units include different combinations of white and colored sub-pixels within the perimeter pixel region, the perimeter pixel units including first perimeter pixel units each having two white sub-pixels and one colored sub-pixel, second perimeter pixel units each having one white sub-pixel and two colored sub-pixels, and third perimeter pixel units each having three white sub-pixels, wherein the third perimeter pixel units are organized into rows, and the white sub-pixels of each of the first and second perimeter pixel units are organized into columns of white sub-pixels.

14. The tileable display panel of claim 13, wherein at least a first portion of the perimeter pixel units include the white sub-pixels.

15. The tileable display panel of claim 14, wherein at least a second portion of the perimeter pixel units include two or more of the colored sub-pixels.

16. The tileable display panel of claim 15, wherein a third portion of the perimeter pixel units are white pixel units that only include reduced size white sub-pixels that are smaller than the colored sub-pixels.

17. The tileable display panel of claim 16, wherein the perimeter pixel region includes two adjacent sub-pixel columns of the white sub-pixels disposed along left and right perimeter regions and includes a row of the white sub-pixels disposed along top and bottom perimeter regions.

18. The tileable display panel of claim 13, wherein the central pixel units of the central pixel region generate the image having an N×M pixel resolution and wherein the perimeter pixel units are extra pixel units outside the N×M pixel resolution.

19. The tileable display panel of claim 18, further comprising:
a Fresnel lens disposed between the screen layer and the plurality of display pixel arrays,
wherein the perimeter pixel units provide extra light to a perimeter boundary of the Fresnel lens to compensate for light truncation of the central pixel units caused by the perimeter boundary of the Fresnel lens.

20. The tileable display panel of claim 13, wherein at least a portion of the perimeter pixel units are rotated 90 degrees relative to the central pixel units.

21. The tileable display panel of claim 13, wherein an inter-array separation pitch between adjacent display pixel arrays is greater than an inter-pixel pitch between adjacent central pixel units.

22. The tileable display panel of claim 21, wherein the perimeter pixel units of the plurality of display pixel arrays have layout patterns that vary based upon locations of each of the plurality of display pixel arrays within the display layer.

23. The tileable display panel of claim 13, wherein the three white sub-pixels of the third perimeter pixel units each having a reduced size relative to the colored sub-pixels in the central pixel region.

24. The tileable display panel of claim 23, wherein the rows of the third perimeter pixel units extend across a top and a bottom of the perimeter pixel region adjacent to the central pixel region.

25. The tileable display panel of claim 24, wherein the columns of white sub-pixels extend across sides of the perimeter pixel region adjacent to the central pixel region.

* * * * *